Patented Dec. 1, 1942

2,303,773

UNITED STATES PATENT OFFICE 2,303,773

TEXTILE FINISHING PROCESS

William J. Thackston, Haddon Heights, N. J., assignor to Röhm & Haas Company, Philadelphia, Pa.

No Drawing. Application October 18, 1938, Serial No. 235,563

6 Claims. (Cl. 117—161)

This invention relates to the finishing of textile fabrics. More particularly it relates to imparting softness, apparent bulk or thickness, increased fullness, and other desirable properties to fabrics and yarns.

Such properties are desired because they are necessary for a pleasing and better "hand" and increase the attractiveness and sales appeal of a fabric. In the past sulfonated tallow, sulfonated olive oil or sulfonated castor oil have been used to impart softness. Relatively important percentages of such softening agents are required. To enhance their effect emulsions of fats, waxes and oils are sometimes used with them and to give greater bulk and stiffness starches, gums, and fillers are frequently used along with the "sulfonated oils." A serious disadvantage from the use of such materials and combinations of materials is often encountered when goods with such finishes are stored for some length of time. Under certain ill-defined conditions, presumably of high humidity or heat or both, the commonly used types of softening compounds develop rancidity, which imparts an objectionable odor to the goods. At the same time discoloration usually results. Furthermore, it often happens that, though no rancidity develops, oils, fats or waxes which have been applied in emulsified form "sweat-out" and leave an objectionable film on the surface of the fabric.

Recent attempts to substitute certain water-soluble or water-dispersible synthetic products, such as sodium cetyl sulfate or cetyl sulfonate, sodium oleyl sulfate, long chain quaternary ammonium compounds, etc. have not been entirely successful. While these products are usually stable and impart softness, they do not impart increased fullness or body to fabric. These compounds, as also the older sulfonated oils, suffer a disadvantage when used with starch or gums, because they may have the effect of thinning the sizing bath and of decreasing the fullness which would have been imparted by a given amount of starch on a fabric.

An unpleasant effect which is presented by many finishes with starch, gums, or other adhesives, with or without fillers, and in spite of the presence of sulfated or sulfonated products, is their tendency to dust out when the fabric is subjected to even mild mechanical treatment. Dust containing some of the newer synthetic materials is highly irritating to the nasal tract. An attempt has been made to overcome the dusting of starch by the addition of various resins which have become widely used in finishing, but the results have not been entirely successful because these resins are all relatively hard and fail to bind the starch to the fibers.

I have discovered, however, that certain materials which are resinous in nature may be used to overcome the difficulties encountered with the various softening and finishing agents which have been in use up to the present time. I have found that certain members of the class of resins, commonly called "alkyd resins" may be used to impart to fabrics various desirable properties. Of the alkyd resins those which impart the optimum degree of softness, bulk and fullness without danger of "sweating out," development of rancidity, or discoloration are those which may be classified as "non-drying" alkyd resins. When these resins are used in the place of sulfonated oils or the sulfated or sulfonated synthetic products discussed above, they give a soft finish which is pleasant to the touch. At the same time they give the fabric a desirable "hand" as to fullness and thickness. These non-drying alkyd resins may be used alone or they may be used in conjunction with other finishing agents, such as starch, gums, adhesives, fillers and the like. The influence of these resinous materials on thickeners and fillers is decidedly unexpected. Instead of decreasing their effectiveness, the non-drying alkyds increase the effects of starches, fillers, etc. in contrast to the influence of the sulfated and sulfonated materials. Thus, instead of thinning out a given starch dispersion, the non-drying alkyds thicken it and the fabric finished with the resin-treated starch feels fuller, thicker and yet soft and pleasant. This permits a saving in sizing material. Furthermore, in contrast to previously used softeners, properly chosen non-drying alkyd resins are not readily washed out. As is well known, textiles softened with sulfonated oils, sulfated higher alcohols, etc. lose their softening agents in the first laundering operation to which the cloth is subjected. Non-drying alkyds of the kind herein described, although not entirely fast, resist rapid removal in laundering in a surprising way. Again, in contrast to sulfonated oils, other oils and waxes and in contrast to some synthetic softening agents the preferred classe of resinous materials does not "sweat out" and is not subject to chemical deterioration during storage. The use of these in place of previously used materials has a further advantage in that smaller amounts of softening agents can be used. Only one-tenth to one-half the amount of my non-drying alkyd type resins is required to give the effects of the previously used agents or to surpass their effectiveness.

The non-drying alkyl type resins which are useful for the kinds of textile-finishing which have been discussed are compositions of matter made by heating together polyhydric alcohols, such as glycerine or glycols, with dibasic acids, such as adipic acid, sebacic acid, phthalic acid, etc., together with modifying non-drying oils, such as castor oil, rapeseed oil, cottonseed oil, cocoanut oil, etc. Within the temperature range which is permissible for textile materials these resinous materials are not heat convertible. Since they do not harden by oxidation, they keep fabrics permanently soft.

It is noted that attempts have been made to utilize convertible alkyd resins in coatings for paper, leather, etc. Such coatings do not, of course, provide finishes which are desired for cloth, unless the cloth is to be made like leather, that is, substantially altered in appearance. The coating materials which have been suggested for sizing paper would likewise be unsuitable for producing desirable, soft finishes in fabrics. A resin with a very high stearic acid content has been proposed for waterproofing paper, but this resin in fabrics in general exhibits many of the faults which are corrected by the present invention.

It is an object of this invention to impart desirable properties to textile fabrics without altering the fabrics as to general appearance or porosity. It is also an object to impart to fabrics softness or softness and fullness in a more permanent way than has heretofore been available. It is a further object to provide a softening and filling agent which will improve the effects of starch, gums, and fillers, when they are used, making them resistant to mechanical removal or dusting. It is a further object to maintain flexibility and a smooth, pleasant finish in articles which are sized with starch, gums, or the like. It is a still further object of this invention to provide effects similar to those imparted by sulfonated oils, but to do so more economically, more efficiently and without the disadvantages of the previously used products.

These objects are accomplished by treating fabric with solutions, dispersions, or emulsions comprising non-drying alkyd type resins alone or with other finishing agents such as starch or gums and with fillers if they are required. Since these resinous materials are not water-soluble, they may be taken up in an organic solvent if they are to be applied in solution. Or if they are applied in an emulsion, they may be taken up in a suitable solvent medium and the solution then emulsified in any appropriate manner. But since in the usual mill applications the presence of solvents is objectionable and emulsions are accordingly avoided, I prefer to use aqueous dispersions of non-drying alkyds which make their application safe, satisfactory and effective without the use of solvents.

By choice of a suitable resin which is soluble in a solvent such as mineral thinner, it is possible to treat some articles for example, those which have been dry-cleaned, and restore to them softness and fullness which would otherwise be lacking. Such a finish is not, of course, permanent, as the non-drying resin can be removed in subsequent dry-cleaning baths. In this type of application the non-drying resinous material is applied in a final clear solvent bath. The presence of one-half to three percent. resin is sufficient to impart the desired effects to fabric or garments.

In the more usual methods of finishing fabrics dispersions are required. The latter may be prepared by stirring into the non-drying resin a concentrated solution of a wetting agent and if needed, a neutralizing agent such as ammonia or caustic solution. Water is then added slowly. At first a water-in oil type emulsion forms, but with more water the type of emulsion reverts and a very finely divided dispersion of resin in water results. Suitable dispersing agents are alkyl phenoxyethyl sodium sulfates, or sulfonated amide esters or other sulfonated synthetic products which are well known today at wetting agents and emulsifiers. This method of preparing the dispersion is described in greater detail in co-pending application Serial No. 211,177 filed June 1, 1938.

Dispersions made in this way give excellent penetration. They may be substituted directly for sulfated and sulfonated products used in present day finishing processes. Dispersions may also be directly added to starch baths or starch-filler baths.

The application of these dispersions does not require any important variation from current textile processing. The fabric or yarn may be run through a bath containing the finishing material, through means for removing excess solution, such as squeeze rolls, through means for drying and then through such other steps as may be required for finishing the particular type of fabric or yarn involved. Details of typical procedures are best shown in the examples for various types of fabrics which are presented herewith.

*Example 1.*—2 x 2, 100 dernier, acetate and viscose rayon crepe is immersed and squeezed in a quetch using a bath containing 5 parts of a 25% dispersion of a non-drying alkyd resin, made from glycerol, phthalic acid, sebacic acid, and castor oil, in 100 parts of cold water. The cloth is loop-dried and framed to width.

The hand is full, thick, and extremely soft; inherent dryness and harshness of such a fabric has been overcome.

*Example 2.*—152 x 80, combed yarn cotton broadcloth is padded with a dispersion of a non-drying alkyd, made from glycerol, sebacic acid, and castor oil, using a bath containing not more than three-fourths percent. of the resinous material. The cloth is can-dried and dried on a frame to width. It may then be given a regular calender finish or be shrunk, as desired.

The finish overcomes the harsh raspiness of this type of construction and produces a moist, full, silky hand, which is expected for high count broadcloths.

*Example 3.*—68 x 72—4.65 yard spun rayon and cotton percale is finished by impregnating with 10 parts of a 25% dispersion of a water-insoluble non-drying alkyd resin, made from glycerol, sebacic acid, castor and rapeseed oils, and 5 parts of 4% locust bean gum solution in 100 parts of water at 120° F., squeezing and drying. After drying, the cloth is framed to width and finished by passing through one nip on a cold calender.

The finished fabric is firm but mellow and full, without the usual lack of character associated with this type of fabric lacking such a treatment.

*Example 4.*—64 x 64—1.65 yard, 90" width cotton sheeting is treated on a starch mangle with a preparation containing—

| | Parts |
|---|---|
| Cornstarch | 2 |
| Potato starch | 2 |
| Talc | 1.25 |
| A 25% dispersion of a non-drying alkyd resin, made with terpineol, glycerol, maleic anhydride, and pine oil | 1.67 | in 100 parts of water. This mixture was prepared by adding the ingredients to the water and heating with steam until 180° F. was reached. The treated cloth was framed, dried and conditioned on a sheeting range, followed by a heavy calendering.

The resulting fabric was firm and heavy but flexible and agreeably soft. At the same time futher mechanical handling, such as tearing, sewing, folding, etc. did not cause dusting, breaking up of the finish, or cracking.

*Example 5.*—80 x 80, 4 yard, carded cotton print cloth was treated with a mixture containing 6.5 parts of cornstarch, 17.5 parts of talc, 3 parts of gum and 1.4 parts of a 25% dispersion of a non-drying, glycerol-sebacic acid-castor oil-rapeseed oil product and water to make 100 parts on a back starching mangle, frame-dried and calendered.

The resulting fabric was heavy, yet flexible, and extremely smooth. Further mechanical handling did not disturb the finish in any way, as by loosening of the starch and filling.

*Example 6.*—A 28 lb. spun rayon-wool challis was impregnated on a three roll quetch with a mixture of 4 parts of a 25% dispersion of an ethylene glycol-sebacic acid-cottonseed oil product and 2 parts of potato starch in 100 parts of water. The cloth was net dried, framed to width and decated.

The resulting fabric was woolly yet pleasantly "soapy" and full. This type of finish overcomes sag which is usually noticeable in the drape of this type of fabric.

*Example 7.*—48 x 48, 40" width, 2.85 yard, cotton sheeting was padded through a mix containing 24 lbs. of tapioca starch, 6 lbs. of dimethylol urea and 3 lbs. of a 25% dispersion of a non-drying alkyd-type resin in 100 gallons of water. The cloth was can-dried, framed and calendered.

The resulting sheeting was full, soft, and might be described as "leathery" instead of being thin and "papery" as it would have been without the non-drying resinous material.

The choice of non-drying alkyd-type resinous material will depend upon a number of factors, such as degree of permanency desired, color of resin, odor, cost factor allowed, etc. Some of the resins are more resistant to laundering than others and when this is an important factor they should be selected with this in mind. The sebacic acid-castor oil-glycerol products are particularly resistant, while those made with cocoanut oil are less resistant. The importance of color depends in large measure upon the color of the material being treated. If white goods are being finished, it is important that the type and the particular lot of resin possess as little color as possible. Color of the resin depends upon the nature of the ingredients, their color, and the conditions under which they are reacted. Odor must be considered in dress goods and a type of resin used which is very low or free from odor when applied. For some applications odor is of little importance although it is always advantageous to keep it at a minimum.

An important limitation depends upon the composition of these resinous materials. I have found that those non-drying alkyd-type resins which are made with more than about 55% fatty acid glyceride are not suitable for the objects of this invention. Too great a fatty acid content gives excessive oiliness or tackiness. In most cases too high a fatty acid content gives no resistance to laundering. Again, with too high a fatty acid content there is danger of discoloration, rancidity and "sweating out." I prefer resinous compositions made with about 30 to 50% of fatty acid glycerides or oils. Lower oil contents than 25% may fail to give the softness and fullness required.

Non-drying, alkyd-type resins are useful not only alone but also with a wide variety of gums, starches, and adhesives. As examples of these may be mentioned gum tragacanth, gum arabic, locust bean gum, Iceland moss, Irish moss, wheat-, corn-, tapioca-, rice-, potato-, sago-, etc. starches, heat-converted-, oxidized-, acid-converted-, and enzyme-converted- starches, etc. Fillers which are widely used include clays and talc. Bluing may be added to improve whiteness.

When fabrics or yarn are treated by my process, they become thoroughly impregnated and not superficially coated. This is an important difference between the behavior of hardenable resins and that of the non-drying resins used in my process. At the same time the non-drying resins can bind starches and similar materials to the fibers. They thus exhibit the advantages of both resinous materials and softeners without the usual disadvantages. Undoubtedly the fine state of dispersion, which is obtained by the method described above, is in part responsible for thorough penetration and impregnation. In this respect apparently dispersions are preferable over emulsions made with resins in solvents, although the latter may often find use.

By the practice of my invention it becomes possible to improve the ordinary finishing of fabrics, imparting greater softness and increased fullness, or producing more economically finishes fully equal to the old in desirable properties. In either case the dangers and disadvantages inherent in the previously available types of finishing agents are avoided. While the appearance of fabric may be made brighter, clearer and more pleasing, by the use of non-drying alkyd type resins, the general appearance usually remains substantially as it was before treatment.

Since there are many variations of this invention which may be practiced without departing from the scope thereof, the examples given are not to be interpreted as limitations.

I claim:

1. The process of finishing a textile fabric which comprises treating said fabric with an aqueous, amylaceous sizing composition having dispersed therein a small amount of a non-hardening, alkyd resin modified with about 30% to about 55% of a non-drying higher fatty acid glyceride, the amount of amylaceous size contained in the composition being in excess of the amount of resin dispersed in the sizing composition, and drying the treated fabric.

2. The process of finishing a textile fabric which comprises treating said fabric with a sizing composition comprising water, starch, and a small amount of a dispersion of a non-hardening, alkyd resin modified with about 30% to about 55% of a non-drying higher fatty acid glyceride, the amount of starch contained in the composition being in excess of the amount of resin dispersed in the sizing composition, and drying the treated fabric.

3. The process of finishing a textile fabric which comprises treating said fabric with a paste comprising water, starch, a water-soluble gum, and a small amount of a dispersion of a non-hardening, alkyd resin modified with 30% to 55% of a non-drying higher fatty acid glyceride, the amount of starch contained in the paste being in excess of the amount of resin dispersed therein, and drying said fabric.

4. A textile fabric finished with an amylaceous size having dispersed therein a softener comprising a non-hardening alkyd resin modified with 30% to 55% of a non-drying higher fatty acid glyceride, the amount of amylaceous material contained in the size being in excess of the amount of resin dispersed therein.

5. A textile fabric finished with a size comprising starch and a non-hardening alkyd resin modified with 30% to 55% of a non-drying higher fatty acid glyceride, the amount of starch contained in the size being in excess of the amount of resin contained therein.

6. A textile fabric finished with a size comprising starch, a water-soluble gum, and a small amount of a non-hardening, alkyd resin modified with 30% to 55% of a non-drying higher fatty acid glyceride, the amount of starch contained in the size being in excess of the amount of resin contained therein.

WILLIAM J. THACKSTON.